(12) United States Patent
Kogge

(10) Patent No.: US 9,436,503 B2
(45) Date of Patent: Sep. 6, 2016

(54) CONCURRENCY CONTROL MECHANISMS FOR HIGHLY MULTI-THREADED SYSTEMS

(71) Applicant: Emu Solutions, Inc., South Bend, IN (US)

(72) Inventor: Peter M. Kogge, Granger, IN (US)

(73) Assignee: EMU SOLUTIONS, INC., South Bend, IN (US)

( * ) Notice: Subject to any disclaimer, the term of this patent is extended or adjusted under 35 U.S.C. 154(b) by 0 days.

(21) Appl. No.: 14/529,277

(22) Filed: Oct. 31, 2014

(65) Prior Publication Data
US 2015/0121382 A1    Apr. 30, 2015

Related U.S. Application Data

(60) Provisional application No. 61/897,849, filed on Oct. 31, 2013.

(51) Int. Cl.
*G06F 9/46*    (2006.01)
*G06F 9/48*    (2006.01)

(52) U.S. Cl.
CPC ................... *G06F 9/4843* (2013.01)

(58) Field of Classification Search
CPC ......... G06F 9/4881; G06F 15/16; G06F 9/48
USPC .............................................. 718/1, 100–109
See application file for complete search history.

(56) References Cited

U.S. PATENT DOCUMENTS

| | | | | |
|---|---|---|---|---|
| 5,692,193 A * | 11/1997 | Jagannathan | ........... | G06F 8/451 711/6 |
| 6,058,466 A * | 5/2000 | Panwar | ................ | G06F 9/3802 712/15 |
| 6,128,640 A * | 10/2000 | Kleinman | ............. | G06F 9/4812 718/102 |
| 6,247,039 B1 * | 6/2001 | Callsen | .................... | G06F 9/52 379/355.09 |
| 6,842,906 B1 * | 1/2005 | Bowman-Amuah | ... | G06F 9/465 718/104 |
| 7,549,465 B2 * | 6/2009 | Gong | ....................... | F28F 9/02 165/150 |
| 7,668,165 B2 * | 2/2010 | Hoskote | ................ | H04L 45/745 370/392 |
| 7,784,057 B2 * | 8/2010 | Davis | ...................... | G06F 9/461 711/100 |
| 7,810,083 B2 * | 10/2010 | Chinya | ............... | G06F 9/45533 712/203 |
| 8,225,326 B2 * | 7/2012 | Petersen | ................. | G06F 9/524 718/102 |
| 8,402,224 B2 * | 3/2013 | Bruening | ............. | G06F 9/3851 711/135 |

(Continued)

OTHER PUBLICATIONS

Gabor et al, "Fairness and Throughput in Switch on Event Multithreading", IEEE, pp. 1-12, 2006.*

(Continued)

*Primary Examiner* — Anil Khatri
(74) *Attorney, Agent, or Firm* — Gesmer Updegrove LLP

(57) ABSTRACT

A system for governing the spawning of a thread from a parent thread by an application in a processor is provided. The system includes a first multiplexor module that selects from one or more registers a policy used to spawn a thread, and makes the policy available for execution. A second multiplexor module selects one or more of the policy values used in a spawn process whose policy was selected by the output of the first multiplexor module, the second multiplexor module outputs a first signal indicative of the selected policy value to accompany the selected policy, which may be given to the child thread as its initial spawn count when the policy so indicates. A third multiplexor module selects either the first signal or a null where the selected policy value of the first signal is used to update the remaining thread credits of the thread's parent.

20 Claims, 7 Drawing Sheets

(56) References Cited

U.S. PATENT DOCUMENTS 8,453,150 B2 * 5/2013 Chung .............. G06F 13/1605
711/100
8,924,964 B2 * 12/2014 Kodi .................. G06F 9/45558
718/1

OTHER PUBLICATIONS

Tseng et al, "Software Data-Triggered Threads", ACM, pp. 703-716, 2012.*

Chen et al, "Free Launch: Optimizing GPU Dynamic Kernel Launches through Thread Reuse", ACM, pp. 407-419, 2015.*

Yang et al,"CUDA-NP: Realizing Nested Thread-Level Parallelism in GPGPU Applications ", ACM, 93-105, 2014.*

Murgai et al, "An Improved Synthesis Algorithm for Multiplexor-based PGA's", IEEE, pp. 380-386, 1992.*

Akkary et al, "On the Potential of Latency Tolerant Execution in Speculative Multithreading", ACM, pp. 1-10, 2008.*

Ungerer et al., "A Survey of Processors with Explicit Multithreading" ACM Computer Surveys, vol. 35, No. 1, Mar. 2003, pp. 29-63.

Kung et al., "Credit-Based Flow Control for ATM Networks" IEEE Network Magazine, Mar. 1995, pp. 1-11.

Blumofe et al., "Cilk: An Efficient Multithreaded Runtime System" Proceedings of the Fifth ACM SIGPLAN Symposium on Principles and Practice of Parallel Programming (PPoPP '95) Santa Barbara, CA, Jul. 19-21, 1995, 11 pages.

Wheeler et al., "Qthreads: An API for Programming with Millions of Lightweight Threads" IEEE 2008, 8 pages.

* cited by examiner

CONCURRENCY CONTROL MECHANISMS FOR HIGHLY MULTI-THREADED SYSTEMS

PRIORITY INFORMATION

This application claims priority from provisional application Ser. No. 61/897,849 filed Oct. 31, 2013, which is incorporated herein by reference in its entirety.

BACKGROUND OF THE INVENTION

The invention is related to the field of high computing processor, and in particular to concurrency control mechanisms for highly multi-threaded systems.

Much of modern software is highly multi-threaded, that is different threads of control executing through a program are active at the same time. More and more computer hardware is implementing support for such multi-threading, as are many programming languages and program packages. A key attribute of such programming is the ability of a thread to "spawn" a new child thread to pursue some line of computation independent of the parent thread.

There are several implementation problems with this that have to date been answered in an ad hoc fashion: how to allocate and control the number of child threads that may be spawned so that limited resources are not overrun, but still use them efficiently; how to control the spawning behavior of child threadlets; and how to detect when a thread and all its children have completed.

SUMMARY OF THE INVENTION

According to one aspect of the invention, there is provided a system for governing the spawning of a thread from a parent thread by an application in a processor. A series of multiplexors select a spawn policy and associated policy value from either the spawn register or an instruction governing the spawn, which in turn are used to compute a spawn credit count to give to the child for its use. Different policies can specify how this child credit count can be computed, such as a constant or a fractional part of the parent's spawn credits. The credit count given to the child is then subtracted from the parent's count and given back to the parent to signify how many additional spawns the parent may make.

According to another aspect of the invention, there is provided a method of governing the spawning of a thread from a parent thread by an application in a processor. The method describes steps for controlling a series of multiplexors in selecting a spawn policy and associated policy value from either the spawn register or an instruction governing the spawn, which in turn are used to compute a spawn credit count to give to the child for its use. Different policies can specify how this child credit count can be computed, such as a constant or a fractional part of the parent's spawn credits. The credit count given to the child is then subtracted from the parent's count and given back to the parent to signify how many additional spawns the parent may make.

DETAILED DESCRIPTION OF THE INVENTION

The invention provides a policy (in either hardware or software) to govern when a thread is permitted to spawn a child thread, how to pass that policy (or a modification of it) to the child threads, how to detect when the last child has finished, and when resources have become scarce, how to reallocate newly freed spawning capabilities to threads that may run out of their original allotments. While of general value, such a capability becomes especially useful when threading is hierarchical, that is one level of threads is responsible for generating a second level, and so on.

Multi-threading has become a wide-spread technique in modern computing systems, supported by either or both hardware and software. The original rationale for such threads was to have additional work for a hardware processor to do when one thread goes to perform an action that will require a relatively long time to complete (such as a memory access or waiting for response of a message), and when, without unrelated computation to switch to, the processor hardware would otherwise go idle in the meantime.

Figure 1:
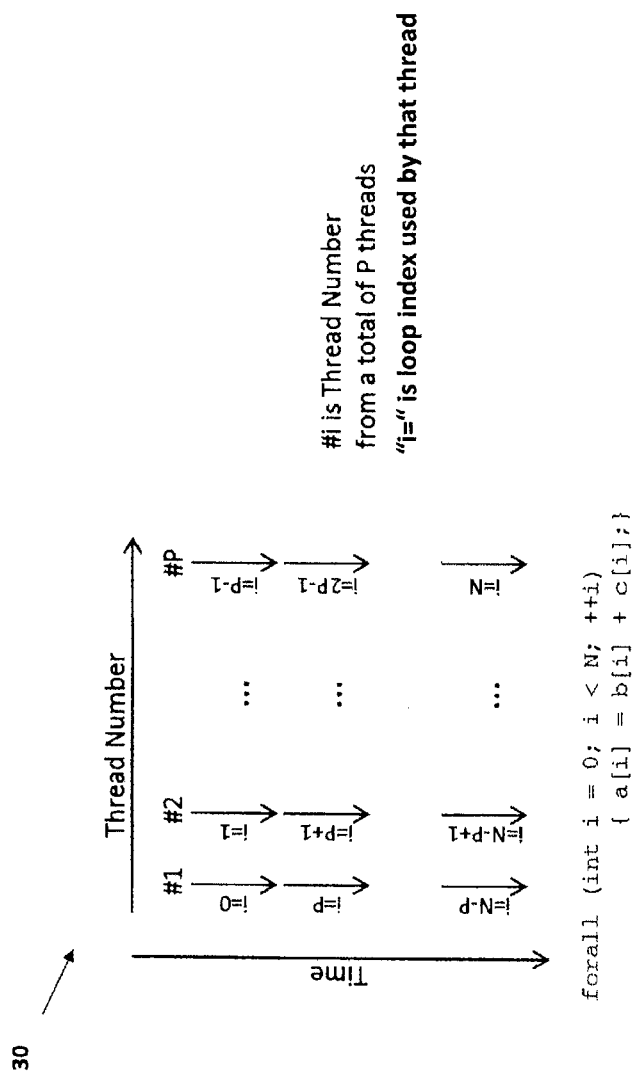
FIG. 1 is a schematic diagram illustrating a fixed number of threads in a larger regular computation.

More recently, threading has been used to simplify the process of identifying opportunities for parallelism in a program, whereby computation can be explicitly divided up into individual units and distributed to separate threads for execution. A common example from programming languages such as Cilk Plus or OpenMP is a parallel "for" loop, where the language specifies some computation that can be done multiple times on different data, and where each instance could be performed "in parallel" by a separate thread. If hardware processors are available to execute different threads in parallel, they are executed in parallel. Otherwise, the additional computations are scheduled for execution only when they can on the available processors. FIG. 1 shows a simple example of a multi-threaded loop 30 over N computations with at most P available threads, where P is much less than N.

This approach is relatively flat; all the opportunities for multi-threading are defined at the same point in the program, and if resources were available all such threads could be dispatched at once. Not until all associated computations are complete do opportunities of additional threading become candidates for thread execution.

Less common, but of growing value, is when computation is less regular and less predictable in advance, and discovered more dynamically and more hierarchically. An example is exploration of a dynamically constructed "tree" 34 of data as pictured in FIG. 2, where at each node 36 of the tree 34 separate threads can be launched to explore each sub-tree 38 below it. How many threads are needed, and against which sub-trees, is not known until the program is run. Programming languages such as Cilk contain constructs for a program to decide on a very dynamic basis when to spawn a new thread, and what that thread should do. Processor architectures have facilities that permit such thread spawning to occur very quickly and very dynamically at low time penalty.

In real programs it is possible to specify opportunities for very large numbers of independent threads that would overwhelm the resources of any real computer.

The almost universal solution to either problem is to have each processor have some maximum number of threads that may be spawned and be active at any one time, and when there are no more, rely on software functions to remember what work has not yet been done and what can be reallocated to other threads when prior work completes. These threads are spawned more or less at once, and are assigned work by some scheduling policy. Two such policies are often called "work-sharing" and "work-stealing."

Figure 2:
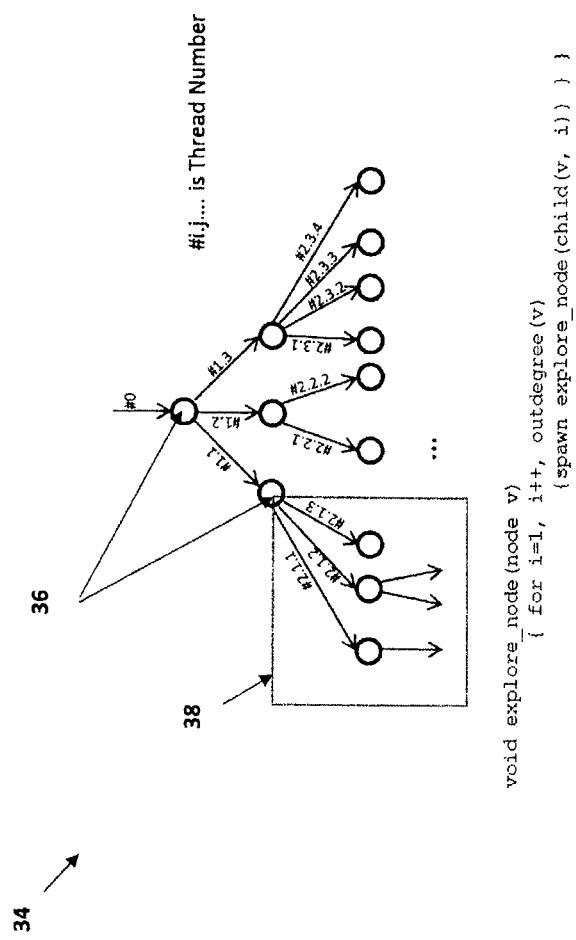
FIG. 2 is a schematic diagram illustrating a dynamic number of threads in an irregular computation.

Such threads, when faced with situations such as FIG. 2, simply try to spawn child threads, with the only constraint being "are there enough resources available?" If multiple threads try to do this at the same time there is no mechanism to either say "this thread is more important than that one" and should get thread resources first, or to constrain one thread from spawning more than other threads. In addition, there is always the possibility of a bad program or a fault in the hardware permitting "runaway" parallelism that consumes all resources, bottlenecking the processor.

The technique introduced by this invention is to give each thread a "spawn credit count" that provides the maximum number of child threads it may spawn. This is similar to credit-based flow control in modern computer networks, where a node in the network uses its credit count to know how much it can send downstream without worry of problems. What is different, however, is that in the technique defined here it is the thread and not the underlying processor that maintains the count, and that a thread always passes to its child thread some part of its spawn credit count as the child's spawn credit count. How much of the parent's credit count is passed to the child is computed by a policy that can also be passed from parent to child. The child can spawn grandchild threads only until the limit passed by its parent is reached. Further, the spawn policy passed by the parent is again used by the child to determine how to compute the credits for the grandchildren, and so on.

Once any thread's spawn credit count reaches zero, it can no longer spawn new threads.

Figure 3:
FIG. 3 is a schematic diagram illustrating policies for computing a child's spawn credit count.

FIG. 3 defines several example policies 42 that may be useful in different situations. Each policy has an associated value that it may use to compute a child's spawn credit. In each case, the spawn credits left with the parent after the spawn is 1 less than the original minus the number of credits given to the child. The decrease by 1 is to account for the spawn of the child itself. No child can be spawned if the parent's value is initially 0, and the amount given the child may be less than desired if there are not enough credits in the parent. Variations of these policies are possible.

Figure 4:
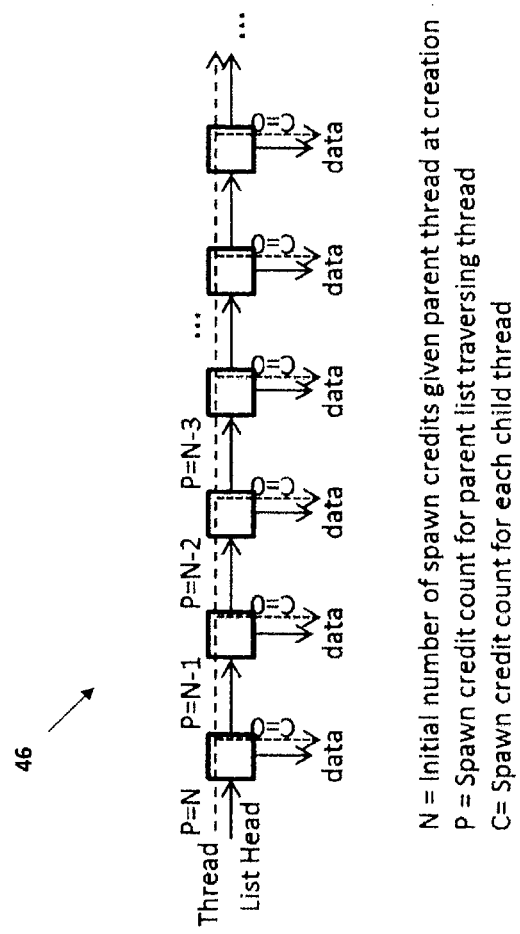
FIG. 4 is a schematic diagram illustrating sample spawn credits during list traversal.

FIG. 4 diagrams how a thread with N initial spawn credits P might proceed down a linked list 46, spawning a single child thread C at each list element to process just that element. Each such child C has no spawn credits to its name, since each such child only processes the single list element and spawns no more grandchildren. A constant policy for the parent, with a new child spawn value of 0 gives the correct credit allocation.

Figure 5:
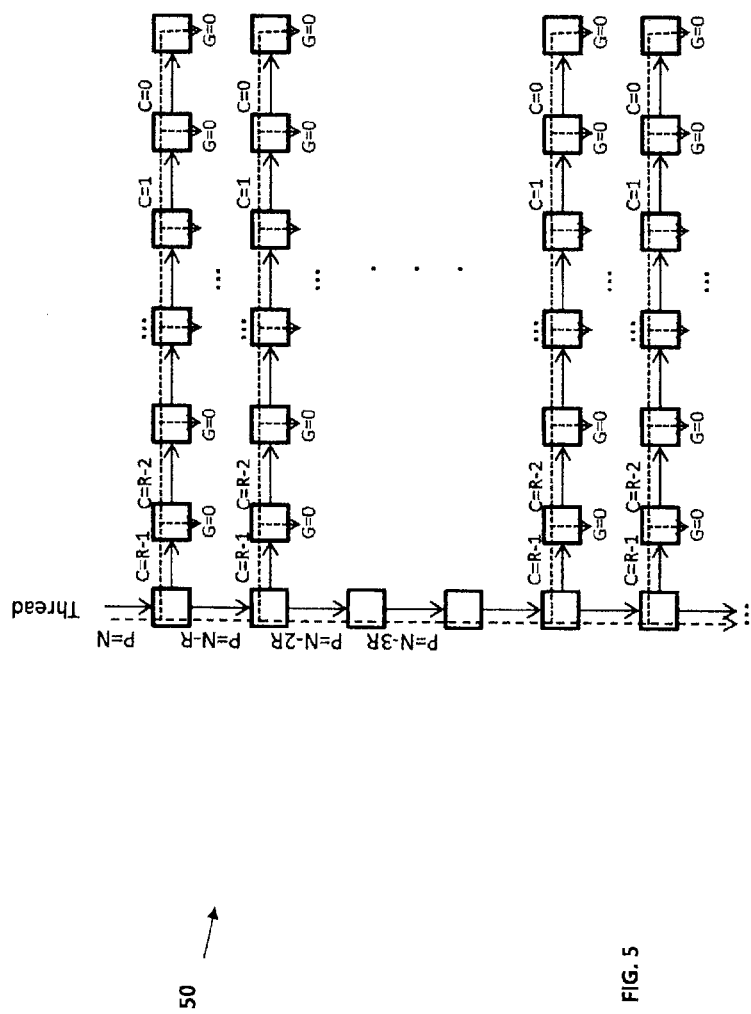
FIG. 5 is a schematic diagram illustrating thread spawning across a 2D array used in accordance with the invention.

FIG. 5 diagrams how a thread might proceed down a two-dimensional array 50, spawning a child thread C for each row that will in turn proceed across that row, spawning a grandchild thread G at each element. The child thread C need not spawn a grandchild G for the last element, since it can process the last element itself. Again a precomputed constant policy with value R−1 for the child (where R is the number of elements in a row), and a constant policy for the grandchild G of 0 satisfies the pattern.

A simple variation of this would handle a sparse matrix where every row might have a different number of elements. The parent thread P could read the number of row elements present at the beginning of each row, and use the dynamically computed option to perform the same function without wasting credits.

Figure 6:
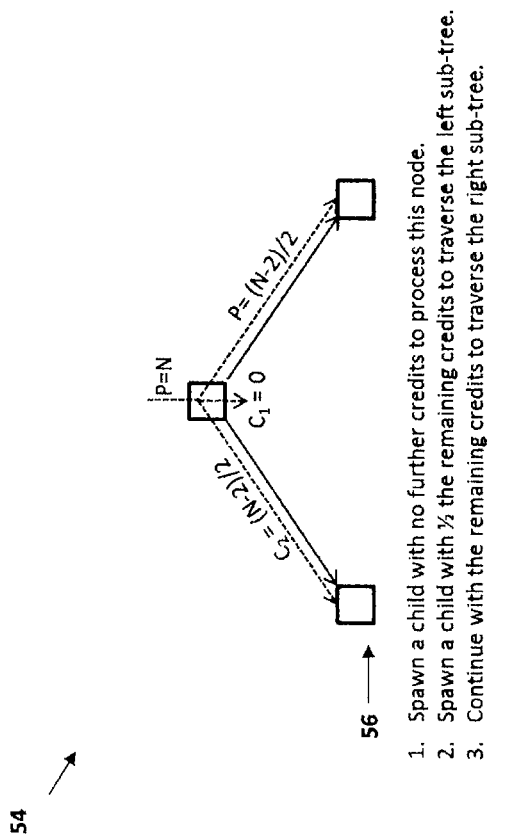
FIG. 6 is a schematic diagram illustrating one step in traversing a b-tree used in accordance with the invention.

FIG. 6 diagrams how a thread may proceed down a B-tree 54, spawning a first child C1 with no further spawn credits for processing the node, and then spawning a second child C2 by splitting the parent's P remaining credits in half. The second child C2 proceeds in one direction (say to the left) while the parent P proceeds in the other direction. Both the second child C2 and the parent P have approximately the same number of credits to repeat the process at the next level 56 of the B-tree 54. The policy for the first child C1 is a predefined constant with a value of 0, while that for the second child C2 is a fractional with a fraction of ½.

Figure 7:
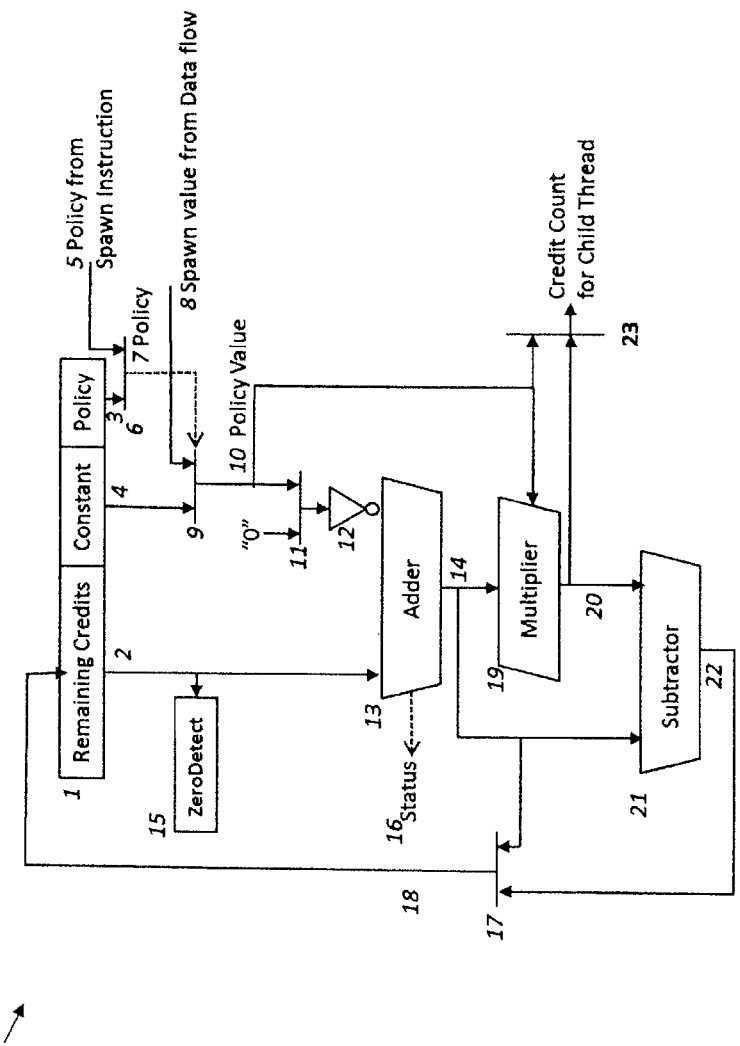
FIG. 7 is a schematic diagram illustrating an implementation in hardware of the invention.

FIG. 7 demonstrates one of many possible implementations 60 in hardware of this process. Equivalent software implementations are also straightforward. One can assume the pictured logic is part of a processor that is executing some thread, and has just started to execute an instruction that spawns a new thread. The register 1 is part of the program state of the thread executing on the processor. This register has fields consisting of the "Remaining Thread Credits," (2) the "Policy" passed by the thread's parent (3), and the "Policy Value" (4) also passed by the thread's parent. This implementation assumes that the actual policy to be used in a spawn may come from either the register 3 or from 5—the instruction executing in the processor associated with the thread, and the associated policy value also from either the register 4 or from a computed value from the data flow 8.

Multiplexor 6 selects as the actual policy to be used by the spawn as either the policy from the instruction 5 or from register 3 and makes that available (7) to the rest of the logic. The choice of which could be on the basis of the opcode of the instruction being executed.

Multiplexor 9 similarly selects one of two policy values to use in the spawn process whose policy was selected by the output of multiplexor 6. These values are the constant from register 4 (for the predefined constant policy), or a value 8 from the processor's data flow (for the computed policy value). The signal labeled 10 is thus the policy value to accompany the policy 7 through the rest of the logic.

The multiplexor 11 selects either the selected value 10 (for constant or predefined policies) or a "0" (for fractional policies). This is complemented by inverter 12 and added via Adder 13 to the Remaining Credits 2 of the parent thread in register 1 to yield signal 14. This has the effect of subtracting the policy value from the Remaining Credits, and then subtracting 1 more to account for the child itself. Note that for the fractional policy, the logic subtracts just "1" from the Remaining Credits 2, reflecting that a parent needs at least one credit to spawn a child.

If either the current Remaining Credits 2 is zero (detected by 15) or the result of the Adder 13 is negative (signal 16), then there are not enough credits to perform the desired spawn completely. If signal 2 was non-zero, but status 16 indicates negative, then there is at least one credit to spawn a child, but not enough to give it all the spawn credits the policy wants. There is thus is a design option to either stop the spawn or allow it to go with a lower credit count than the policy specifies.

If the spawn policy is "fractional" then the signal 14 (which is the parent's remaining spawn count minus 1) is multiplied by the fractional policy value 10 to determine the number of credits 20 to pass to the child, with the result 20 also subtracted from the signal 14 in subtractor 22 to adjust the credit count to return to the parent.

If the spawn is allowed to proceed, the multiplexor 17 then selects either the signal 14 (when the policy is "constant") or signal 22 (when the policy is "fractional") to go back to register 1 as the new remaining credits for the parent thread.

Depending on implementation choices, the multiplier 19 may be a simple shift matrix and not a full multiplier, if fractions that are ratios of powers of 2 are satisfactory.

Also depending on the policy, multiplexor 23 will select either signal 10 ("constant" policy) or signal 20 ("fractional" policy) to give to the child thread as its initial Remaining Credits.

There are also options as to what policy and policy values to pass to the child thread for its use. One may simply be the same as used by the parent. Another may be to provide the child's policy explicitly from the instruction. A third may be to keep not one policy/value pair in each thread but a "vector" of them, where the "left-most" one is used by a thread when it executes a spawn. In this case the child thread could then receive the same vector but "shifted left" one position (with options as to what the "right-most" pair of the vector becomes, such as a duplicate of its predecessor or some standard such as constant/0). This permits a program that will generate a hierarchy of threads to pre-define the policies for each level.

It is clearly possible for a mechanism as described here to spawn through one or more levels a large and unpredictable in advance number of threads that all have concurrent execution. Clearly it is important to detect when all such threads have completed. Many programming languages that support parallel threads have constructs such as "barriers" or "sync" points where progress beyond the point requires knowing that all prior computations have completed.

A key feature of the invention described here is that the original ancestor of a "swarm" of such descendent threads had in its spawn credit field a count of the maximum number of thread "lives" that could be active at any one time during the lifetime of the application. Note that this count is set by the application, not a default by the hardware or system, and there may in fact be multiple ancestor threads from multiple applications that may all be active at the same time, but each with a well-defined maximum internal concurrency.

To determine when all threads from a single application have terminated one can associate a counter with each application. This counter may be in either a hardware register or a memory location modifiable by software.

As each thread in an application reaches the end of its computation, it adds into its application counter the remaining spawn credits it has not used, plus "1". The extra "1" is to account for the life of the thread itself. The "add" must be atomic, that is if two or more threads try to update the same counter at the same time, the additions must be done in an order that guarantees that no update is lost. This is a common capability today.

There are at least three options to use this application counter to determine when all threads for the application are complete. First, the counter may be initialized to the negative of one plus the spawn count in the original ancestor thread (the "1" is again for the life of the ancestor thread itself). Now, after a thread has updated its application counter, it can check if the result of the add was zero. If so, then the thread knows that it is in fact the last of the threads to complete, and whatever comes next can be started.

The second approach is useful when there is some original application thread that launched the first ancestor and doesn't want to be bothered with knowing that the swarm resulting from its descendants has completed until some later point in time when it has completed some other separate activities (up to and including launching several other swarms of threads, each with its own maximum spawn count), and now must wait for completion. In this case the initial value for the application counter can be one, meaning that unless something is done, none of the descendant threads will see a zero at their completion. When the original master now wants a completion alert, it can atomically subtract from the counter the negative of the overall swarm count plus one. If the result of this sum is zero then the master knows all threads have been completed. If the counter is still negative, then as the remaining threads complete, again the last thread will detect a result of zero and signal the master.

To implement this, the atomic add must also be guaranteed to return to the add's requestor the value of the sum being returned to the counter. If two adds are attempted at the same time, they must be done in an order that guarantees this. Again this capability is available in many current systems.

A third option pairs each counter with a separate maximum count. The counter itself is initialized to zero as above, but after each update the thread doing the update compares the post-add value of the counter with the maximum count. If the two values match, again the thread knows it was the last. Also if this maximum count is set to zero initially, then no completing thread will detect it is the last. The master can then replace the zero in the maximum value with the actual value, and see if the current count matches that. If so, the master continues; if not the master can wait to be alerted. This approach has the advantage of having in the counter the number of spawns that were allocated to the overall ancestor, but are definitely no longer tied to any thread.

Having different counters for different applications allows for independent detection of the completion of different swarms.

For large numbers of threads a single counter may represent a "hot spot" if many threads attempt to access it at the same time. This could be avoided by distributing the counter updates into data structures where smaller numbers of threads try to access separate counters. For example, a tree of such counters could be built, with each node in the tree holding a running count of the number of credits returned, plus the number of threads that need to report to that node before the aggregate count be forwarded up the tree and the process repeated.

As with today's approaches, there is always the possibility that some thread may want to spawn children but cannot because of a lack of credits. As discussed above, many programming languages have mechanisms where work that has not been done because of an inability to spawn can be tracked and restarted when threads complete. This is certainly still possible with the invention described here, but there are also some alternatives opened up by this invention. In particular, when an attempt to spawn fails because of a lack of credits, the thread could be programmed to go to the termination counter and see if there are any credits that have been returned there. If so, an atomic subtract can remove some credits to allow the spawn to continue. If there are no available credits, the same mechanisms already in use today can be invoked to record the unprocessed work.

Note that such a subtraction of credits must also be done atomically, but again would never result in an incorrect termination signal since the thread wanting more credits has not returned at least its life count, and thus the returned count cannot match the total.

This invention allows explicit control over the spawning of new threads in a multi-threaded system whereby tight controls over maximum concurrency can be maintained but distributed where they are needed in an intelligent fashion. Further, easy mechanisms can be built to reallocate spawn credits when needed and still detect in a timely fashion when all threads have completed.

Although the present invention has been shown and described with respect to several preferred embodiments thereof, various changes, omissions and additions to the form and detail thereof, may be made therein, without departing from the spirit and scope of the invention.

What is claimed is:

1. A system for governing the spawning of a thread from a parent thread by an application in a processor:
   one or more registers or memory locations that store values associated with remaining thread credits with respect to a thread, a policy passed by the thread's parent, and a plurality of policy values associated with the thread's parent;
   a first multiplexor module that selects from the one or more registers the policy used to spawn a thread, and makes the policy available for execution;
   a second multiplexor module that selects one or more of the policy values used in
   a spawn process whose policy was selected by the output of the first multiplexor module, the second multiplexor module outputs a first signal indicative of the selected policy value to accompany the selected policy, which may be given to the child thread as its initial spawn count when the policy so indicates; and
   then subtracted from the second signal to update the parent's spawn count;
   a third multiplexor module that selects either the first signal or a null where the selected policy value of the first signal is used to update the remaining thread credits of the thread's parent by subtracting the selected policy value from the remaining thread credits.

2. The system of claim 1, wherein the third multiplexor provides its output to an inverter and adder to subtract the policy value, plus 1, from the parent's remaining thread credits, and outputs a second signal.

3. The system of claim 2, wherein the second signal is optionally multiplied by the policy value to output a third signal representing the number of spawn credits to be given to the child thread in place of the policy value.

4. The system of claim 1, wherein the application keeps a counter of the number of available spawns that threads for the application performs, with a negative value indicating that there are threads still active, a zero indicating that all threads have completed and returned all their credits, and a positive value indicating there are spawn credits available.

5. The system of claim 4, wherein when the thread reaches the end of its computation, it atomically adds into to an application counter the remaining spawn credits it has not used, plus 1.

6. The system of claim 1, wherein the thread uses an application counter having an initial value of minus the original spawn count minus one, so that the last thread to complete will find a counter value of zero, indicating it is in fact the "last" thread.

7. The system of claim 4, wherein the counter can be initialized to one so that none of the descendant threads are zero at their completion, and the application can atomically add the negative of the overall swarm count plus 1 at its leisure to determine completion of all threads.

8. The system of claim 4, wherein the thread uses an application counter that is initialized to zero as above, but after each update the thread doing the update compares the post-add value of the counter with the maximum count.

9. The system of claim 8, wherein the application counter is paired with a maximum count, wherein if the two values match, the thread knows it was the last.

10. The system of claim 1, wherein the thread uses an application counter that is a hardware register or a memory location.

11. A method of governing the spawning of a thread from a parent thread by an application in a processor:
    storing values associated with remaining thread credits with respect to a thread, a policy passed by the thread's parent, and a plurality of policy values associated with the thread's parent using one or more registers;
    selecting from the one or more registers the policy used to spawn a thread, and makes the policy available for execution using a first multiplexor module;
    selecting one or more of the policy values used in a spawn process whose policy was selected by the output of the first multiplexor module using a second multiplexor module, the second multiplexor module outputs a first signal indicative of the selected policy value to accompany the selected policy, which may be given to the child thread as its initial spawn count when the policy so indicates; and
    then subtracted from the second signal to correct the parent's spawn count;
    selecting either the first signal or a null where the selected policy value of the first signal is used to update the remaining thread credits of the thread's parent using a third multiplexor module by subtracting the selected policy value from the remaining thread credits.

12. The method of claim 11, wherein the third multiplexor provides its output to an inverter and adder to subtract the policy value, plus 1, from the parent's remaining thread credits, and outputs a second signal.

13. The method of claim 12, wherein the second signal is optionally multiplied by the policy value to output a third signal representing the number of spawn credits to be given to the child thread in place of the policy value.

14. The method of claim 11, wherein the application keeps a counter of the number of available spawns that threads for the application performs, with a negative value indicating that there are threads still active, a zero indicating that all threads have completed and returned all their credits, and a positive value indicating there are spawn credits available.

15. The method of claim 14, wherein when the thread reaches the end of its computation, it atomically adds into to an application counter the remaining spawn credits it has not used, plus 1.

16. The method of claim 11, wherein the thread uses an application counter having an initial value of minus the original spawn count minus one, so that the last thread to complete will find a counter value of zero, indicating it is in fact the "last" thread.

17. The method of claim 14, wherein the counter can be initialized to one so that none of the descendant threads are zero at their completion, and the application can atomically add the negative of the overall swarm count plus 1 at its leisure to determine completion of all threads.

18. The method of claim 14, wherein the thread uses an application counter that is initialized to zero as above, but after each update the thread doing the update compares the post-add value of the counter with the maximum count.

19. The method of claim 18, wherein the application counter is paired with a maximum count, wherein if the two values match, the thread knows it was the last.

20. The method of claim 11, wherein the thread uses an application counter that is a hardware register or a memory location.

* * * * *